US009823893B2

United States Patent
Bhat et al.

(10) Patent No.: US 9,823,893 B2
(45) Date of Patent: Nov. 21, 2017

(54) PROCESSING OF VOICE CONVERSATIONS USING NETWORK OF COMPUTING DEVICES

(71) Applicant: International Business Machines Corporation, Armonk, NY (US)

(72) Inventors: Gautam K. Bhat, Mangalore (IN); Gregory J. Boss, Saginaw, MI (US); Kevin C. McConnell, Austin, TX (US); Minh Pham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 14/799,911

(22) Filed: Jul. 15, 2015

(65) Prior Publication Data
US 2017/0017459 A1   Jan. 19, 2017

(51) Int. Cl.
G06F 17/00 (2006.01)
G06F 3/16 (2006.01)

(52) U.S. Cl.
CPC .............. G06F 3/165 (2013.01); G06F 3/167 (2013.01)

(58) Field of Classification Search
CPC ........ G06F 3/165; G06F 3/167; H04M 1/575; H04M 3/568; H04M 3/569; H04M 3/42042; H04M 3/567; G10L 17/00; G10L 17/005
See application file for complete search history.

(56) References Cited

U.S. PATENT DOCUMENTS

| 4,860,366 A | 8/1989 | Fukushi et al. |
|---|---|---|
| 6,978,159 B2 | 12/2005 | Feng et al. |
| 8,457,328 B2 | 6/2013 | Virolainen et al. |
| 8,483,099 B2 | 7/2013 | James et al. |
| 8,606,249 B1 | 12/2013 | Goodwin |
| 8,831,761 B2 | 9/2014 | Kemp et al. |
| 8,861,756 B2 | 10/2014 | Zhu et al. |

(Continued)

FOREIGN PATENT DOCUMENTS

| WO | 2011073735 A1 | 6/2011 |
|---|---|---|
| WO | 2012105844 A1 | 8/2012 |

OTHER PUBLICATIONS

Lee et al. "SocioPhone: Everyday Face-to-Face Interaction Monitoring Platform Using Multi-Phone Sensor Fusion", MobiSys'13, Taipei, Taiwan; Jun. 2013.

(Continued)

*Primary Examiner* — Andrew C Flanders
(74) *Attorney, Agent, or Firm* — Brown & Michaels, PC; John R. Pivnichny (57) ABSTRACT

A method of processing audio through devices connected in a network. The devices include at least a device of a first user and at least one of the devices is a device of another user. The devices comprising at least an audio sensor for detecting audio from the other user, and the device of the first user comprising a processor coupled to at least a speaker for outputting audio. The device of the first user monitors audio from at least one audio sensor on a device of another user for preferences selected by the first user. When the device of the first user detects a preference within the audio, the device of the first user sends a notification to the first user regarding preference detected; and based on an input from the first user, plays the audio for the first user through the speaker.

18 Claims, 4 Drawing Sheets

(56) References Cited

U.S. PATENT DOCUMENTS

| | | | |
|---|---|---|---|
| 2004/0013252 A1* | 1/2004 | Craner | H04M 1/247 379/142.01 |
| 2004/0172252 A1* | 9/2004 | Aoki | H04M 3/564 704/270 |
| 2008/0101624 A1 | 5/2008 | Schentrup et al. | |
| 2009/0089055 A1* | 4/2009 | Caspi | H04M 3/56 704/235 |
| 2009/0264114 A1* | 10/2009 | Virolainen | H04M 3/56 455/416 |
| 2010/0020951 A1* | 1/2010 | Basart | H04M 15/06 379/142.01 |
| 2011/0044474 A1* | 2/2011 | Grover | H04M 3/40 381/107 |
| 2011/0289410 A1 | 11/2011 | Paczkowski et al. | |
| 2011/0301730 A1* | 12/2011 | Kemp | G10L 19/008 700/94 |
| 2013/0022189 A1 | 1/2013 | Ganong, III et al. | |
| 2013/0024196 A1 | 1/2013 | Ganong, III et al. | |
| 2013/0321133 A1* | 12/2013 | Michaelis | H04M 3/569 340/10.42 |
| 2015/0255068 A1* | 9/2015 | Kim | G10L 17/04 704/246 |
| 2016/0275952 A1* | 9/2016 | Kashtan | G10L 17/00 |

OTHER PUBLICATIONS

Sur et al. "Autodirective Audio Capturing Through a Synchronized Smartphone Array"; MobiSys'14, Bretton Woods, NH, USA, Jun. 2014.

Griffiths, S. "The hearing aid for SPIES: Clip-on amplifier eavesdrops on conversations and even translates foreign languages in real time", http://www.dailymail.co.uk/sciencetech/article-2788297/the-hearing-aid-spies-clip-amplifier-eavesdrops-conversations-translates-foreign-languages-real-time.html; Oct. 2014.

* cited by examiner

PROCESSING OF VOICE CONVERSATIONS USING NETWORK OF COMPUTING DEVICES

BACKGROUND

The present invention relates to voice processing, and more specifically to voice processing using a network of computing devices.

During conferences or classes it can be difficult for individuals in the audience to filter out unrelated noise and focus on the presenter. The difficulty increases for individuals that have hearing loss or who need language clarification or processing.

Currently, individuals with hearing loss wear various types of hearing aids which amplify noise within a short distance, including noise from unintended sources within a predefined distance of frequency range.

SUMMARY

According to one embodiment of the present invention a method of processing audio through devices connected in a network is disclosed. One of the devices is a device of a first user and at least one of the devices is a device of another user. The device of another user comprising at least an audio sensor for detecting audio from the other user, and the device of the first user comprising a processor coupled to at least a speaker for outputting audio. The method comprising the steps of: the device of the first user monitoring audio from at least one audio sensor on a device of another user for preferences selected by the first user. When the device of the first user detects a preference within the audio, the device of the first user: sending a notification to the first user regarding preference detected; and based on an input from the first user, playing the audio for the first user through the speaker.

According to another embodiment of the present invention, a computer program product for processing audio through devices connected in a network is disclosed. One of the devices is a device of a first user and at least one of the devices is a device of another user. The device of another user comprising a computer comprising at least one processor, one or more memories, one or more computer readable storage media, the computer program product comprising a computer readable storage medium having program instructions embodied therewith, at least an audio sensor for detecting audio from the other user. The device of the first user comprising a computer comprising at least one processor coupled to at least a speaker for outputting audio, one or more memories, one or more computer readable storage media, the computer program product comprising a computer readable storage medium having program instructions embodied therewith. The program instructions executable by the computer to perform a method comprising: monitoring, by the device of the first user, audio from at least one audio sensor on a device of another user for preferences selected by the first user. When the device of the first user detects a preference within the audio: sending by the device of the first user, a notification to the first user regarding preference detected; and based on an input from the first user, playing the audio for the first user through the speaker.

DETAILED DESCRIPTION

In an illustrative embodiment, it is recognized that the methods, computer program product and computer system may be implemented through a device which has location sensors which can provide information regarding location and audio sensors which can identify, amplify and replay audio. The device also preferably contains a storage device or repository 74, or the storage device or repository could be accessed over a network.

In another illustrative embodiment, it is recognized that a network of device computers with the device computers including sensors which can provide information regarding location and sensors which can identify, replay, and amplify audio, including specific words and phrases that the first user is interested in hearing or that would provide some benefit to the first user. In one illustrative embodiment, a sound map is created on the first user's device computer that shows where other users are present in the immediate vicinity. The sound map allows a user to select which conversations to process. In another illustrative embodiment, the first user's device computer processes conversations based on programmatic evaluations of who is present in the immediate vicinity to the first user. The first user's device computer can further identify keywords and can process conversations including these identified keywords. The processed conversations may be delivered to the first user through a hearing device of the first user.

Figure 1:
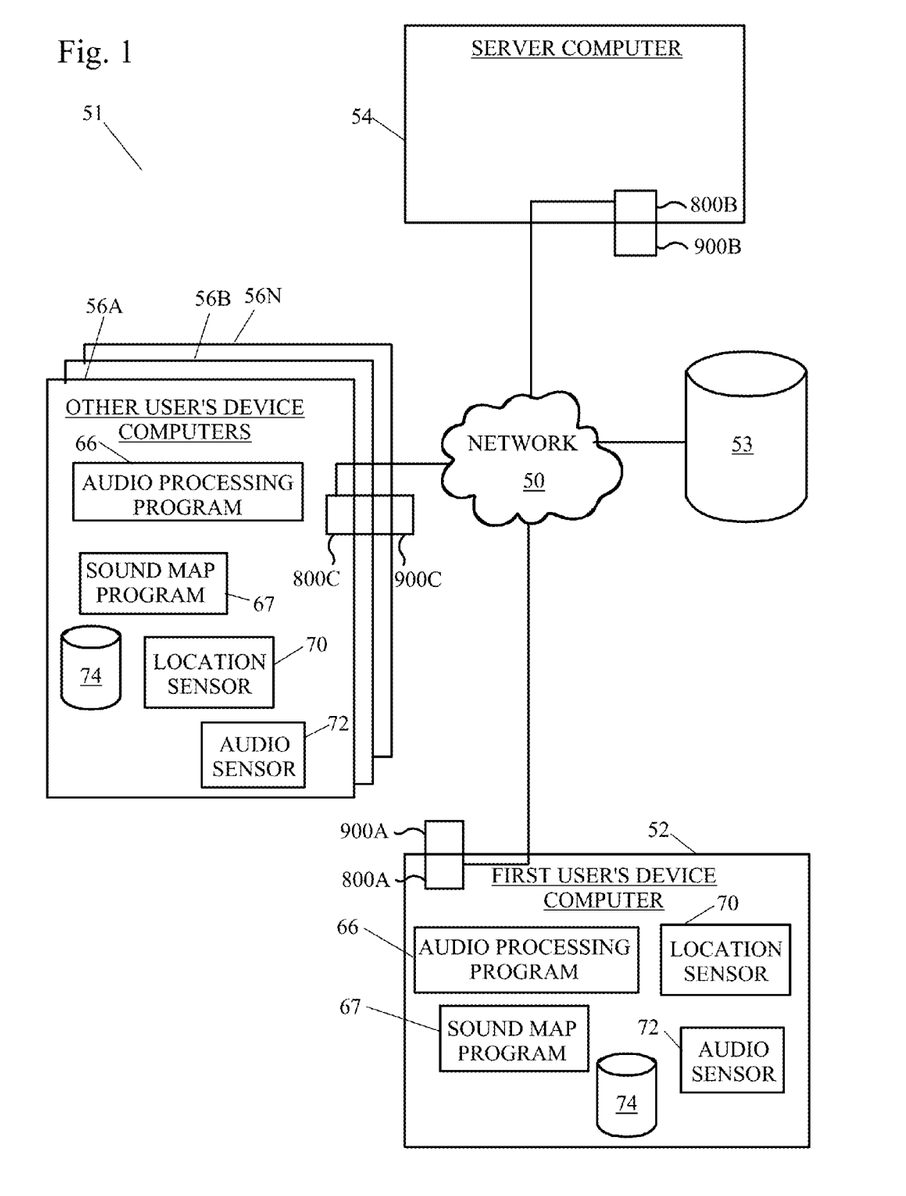
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a first user's device computer 52, a plurality of other user's device computers 56a-56n, a repository 53, and a server computer 54 connect to network 50. It should be noted that the other user's device computers 56a-56n are devices other than from the first user's device computer 52. The other user device computers 56a-56n may also be a first user. In other exemplary embodiments, network data processing system 51 may include additional client or device computers, storage devices or repositories, server computers, and other devices not shown.

The first user's device computer 52 may be, for example, a mobile phone, a personal digital assistant (PDA), a netbook, a laptop computer, a tablet computer, a desktop computer, or any other type of computing device which can provide information regarding location and sensors which can identify and amplify audio, including specific words and phrases.

The first user's device computer 52 may contain an interface, which may accept commands and data entry from a user. The interface can be, for example, a command line interface, a graphical user interface (GUI), a natural user interface (NUI) or a touch user interface (TUI). The first user's device computer 52 preferably includes an audio processing program 66 and a sound map program 67. Alternatively, the audio processing program 66 may include the sound map program 67. While not shown, it may be desirable to have the audio processing program 66 and the sound map program 67 be present on the server computer 54.

The first user's device computer 52 preferably includes location sensors 70 which can provide information regarding location, for example through a global positioning system (GPS) receiver or other sensors. The first user's device computer may also include audio sensors 72 which can identify, replay, record and amplify audio, including specific words and phrases, for example a microphone, speaker, or radio. The device is also preferably able to record and store audio which has been amplified for playback at a time other than when the audio is being recorded. The first user's device computer 52 includes a set of internal components 800*a* and a set of external components 900*a*, further illustrated in FIG. 4.

The other user's device computers 56*a*-56*n* may be, for example, a mobile phone, a personal digital assistant (PDA), a netbook, a laptop computer, a tablet computer, a desktop computer, or any other type of computing device which can provide information regarding location and sensors which can identify and amplify audio, including specific words and phrases. The first user's device computer 52 preferably includes location sensors 70 which can provide information regarding location, for example through a global positioning system (GPS) receiver or other sensors. The first user's device computer may also include audio sensors 72 which can identify, replay, record and amplify audio, including specific words and phrases, for example a microphone, speaker, or radio. The device is also preferably able to record and store audio which has been amplified for playback at a time other than when the audio is being recorded.

The other user's device computers 56*a*-56*n* may contain an interface. The interface 57 may accept commands and data entry from a user. The interface can be, for example, a command line interface, a graphical user interface (GUI), a natural user interface (NUI) or a touch user interface (TUI). The other user's device computers 56*a*-56*n* preferably includes an audio processing program 66 and a sound map program 67. While not shown, it may be desirable to have the audio processing program 66 and the sound map program 67 be present on the server computer 54. The other user's device computers 56*a*-56*n* includes a set of internal components 800*c* and a set of external components 900*c*, further illustrated in FIG. 4.

Figure 4:
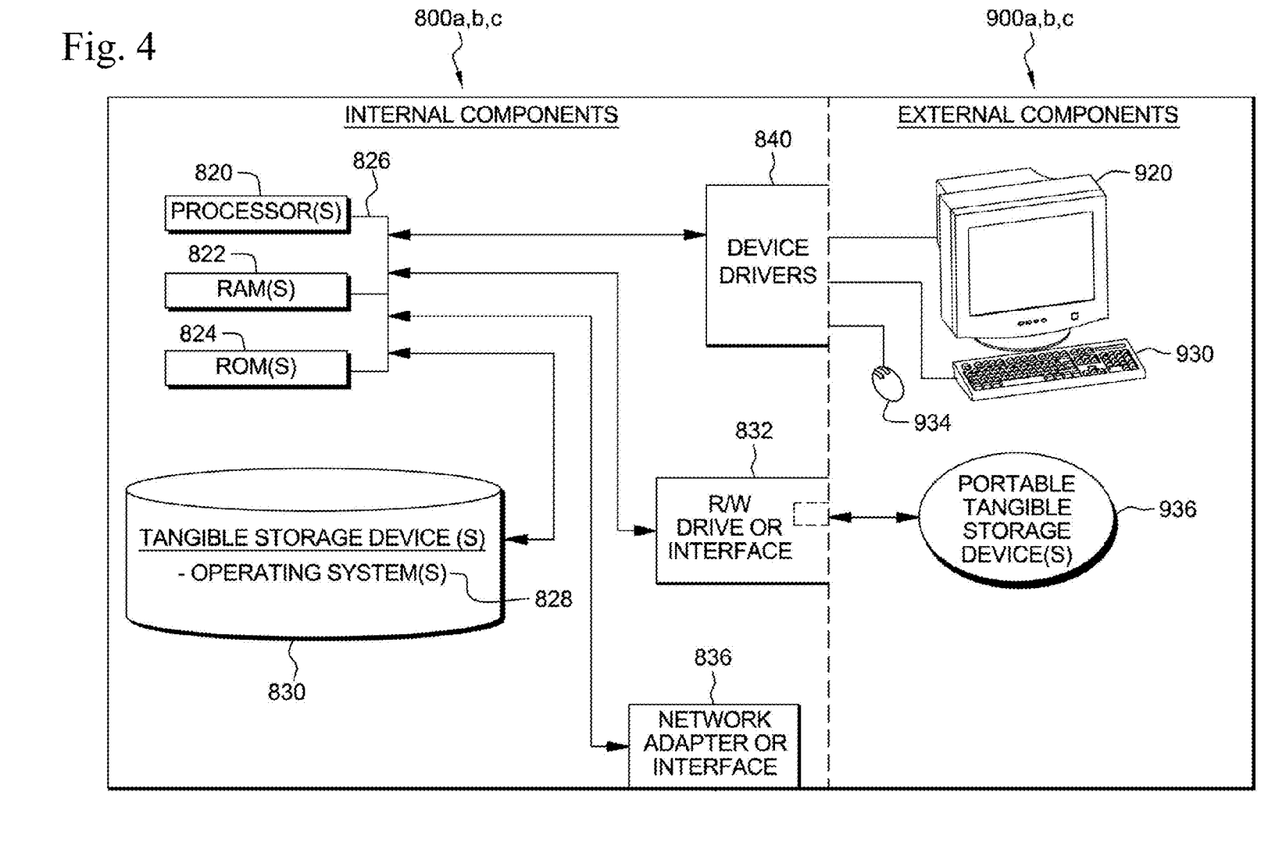
FIG. 4 illustrates internal and external components of a mobile device and a personal imaging device and a server computer in which illustrative embodiments may be implemented

Server computer 54 includes a set of internal components 800*b* and a set of external components 900*b* illustrated in FIG. 4. In the depicted example, server computer 54 provides information, such as boot files, operating system images, and applications to the first user's device computer 52 and the other user's device computers 56*a*-56*n*. Server computer 54 can compute the information locally or extract the information from other computers on network 50.

Figure 2:
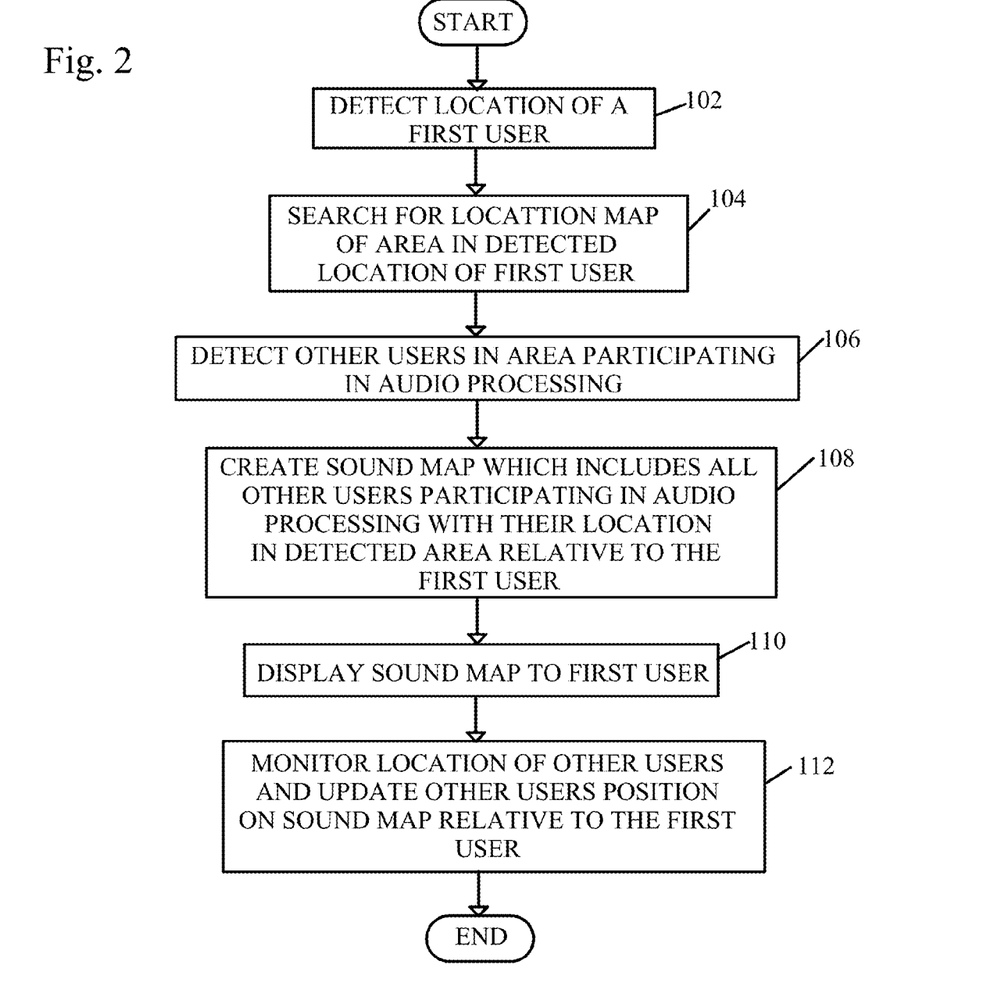
FIG. 2 shows a flow diagram of a method of creating a sound map of other users within a location relative to a first user.

FIG. 2 shows a flow diagram of a method of creating a sound map of other users within a location relative to a first user.

In a first step, a first user's device computer, for example through the sound map program 67, detects a location of the first user (step 102). The detection of the location of the first user may be carried out through the use of a location sensor such as a global positioning system and associated GPS receiver in the first user's device computer.

A location map of the area of the detected location may be searched for (step 104), for example by the sound map program 67. The location map searched for may be an indoor map showing aspects of rooms and/or buildings, and may also be leveraged to provide additional details regarding the location of the first user and other users.

Other users in the located area which are participating in audio processing are detected (step 106), for example by the sound map program 67 through location sensors of the first user's device computer 52 such as BlueTooth® and WiFi™. The BlueTooth® sensors use wireless technology for exchanging data over short distances from fixed devices. WiFi™ uses local area wireless computer networking technology to allow electronic devices to network and can identify other users on the network. Users which are participating in the audio processing share at least a microphone and radio of their device computers 56*a*-56*n*. Furthermore, users which are participating in the audio processing are preferably all connected via a network.

A sound map is then created which includes physical locations of all other user participants who are participating in audio processing in the first user's detected location (step 108), for example by the sound map program 67.

The created sound map is displayed to the first user (step 110).

The locations of other users are monitored and the sound map is updated to show the location of the other users relative to the first user's location (step 112), for example by the sound map program 67 and the method ends.

Figure 3:
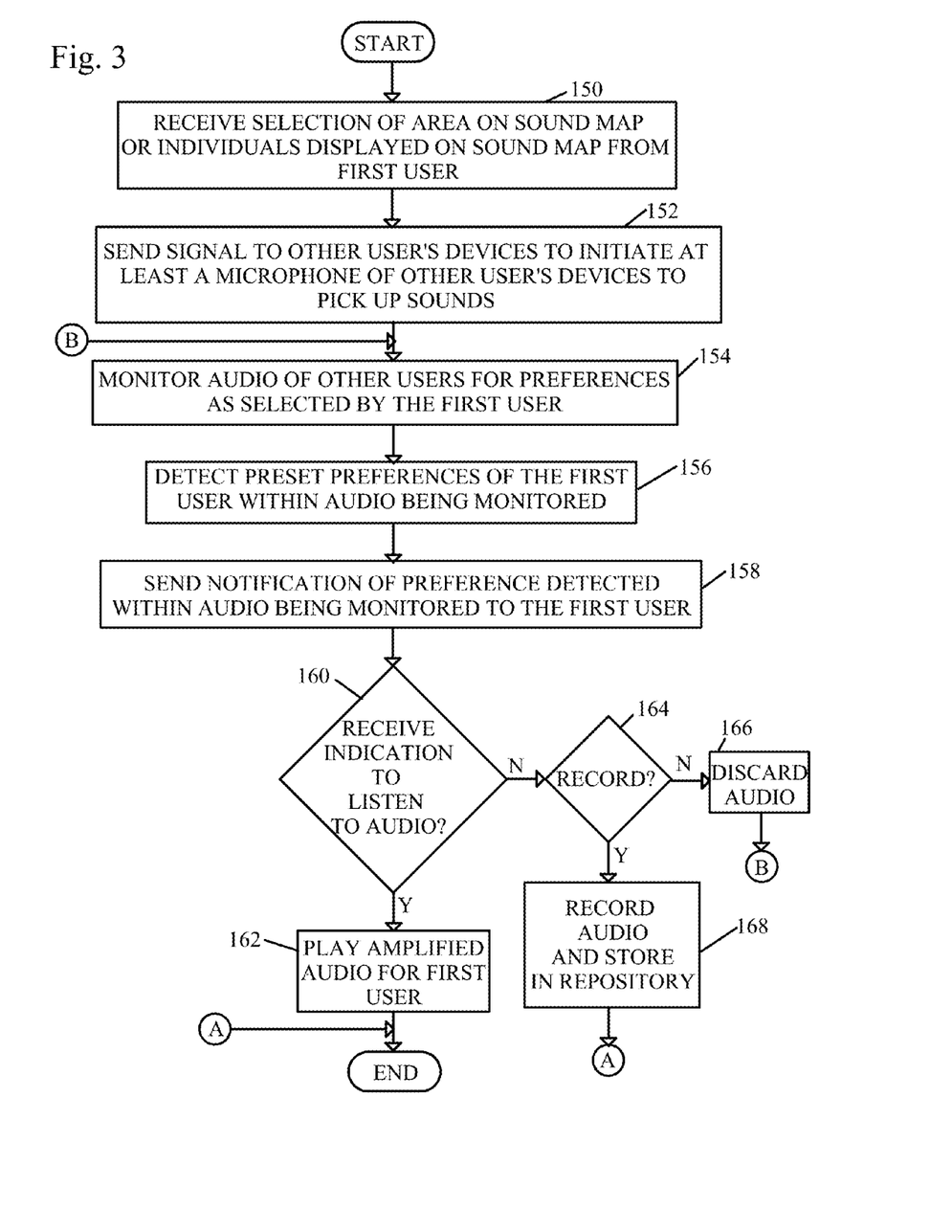
FIG. 3 shows a flow diagram of a method of processing audio of other individual users for playback to the first user.

FIG. 3 shows a flow diagram of a method of enhancing audio of other individual users for the first user.

A selection of an area or individuals displayed on the sound map is received from the first user (step 150), for example through the audio processing program 66 or the sound map program 67, which may be part of the audio processing program 66. The selection of the area or individuals in which processed audio is requested by the first user may be further defined by the first user and the first user's preferences. The sound map be generated by the method shown in FIG. 2.

For example, the first user may define specific keywords or phrases that when spoken by others, the first user desires to hear the conversation in which these words/phrases are used. The specific keywords or phrases can also be specific to certain individuals.

In another example, the first user may set the preference to specifically process audio when a specific individual speaks. These preferences may be shared with the other user's participating in audio processing or maintained privately by the first user.

The specific individual may be set by name, sound of their voice (voice print), or by their position within a hierarchy, such as company or other organization. The hierarchy may be further defined by the first user and may be designated within the first user's contacts stored in a repository of the first user's device computer. Alternatively, the hierarchy may be further defined by an organization's directory or the other user's participating in audio processing.

The hierarchy may be updated as relationships within the hierarchy change and when the first user's relationships with individuals within the hierarchy changes or the first user's position in the hierarchy itself changes.

In yet another example, the first user may set the preference to specifically process audio when anyone from an organization speaks.

In terms of the area selected by a first user, the first user may define a dynamic region surrounding the first user in which the first user desires processed audio. For example, the first user may choose a dynamic region which is in a radius of 10 to 20 feet from the first user. If a dynamic region is selected by the first user, sensors of the first user's device computer can determine whether the first user has moved, and the dynamic region in which audio is to be processed may be updated accordingly. Alternatively, the dynamic region may determine the location of the first user and other user's which are participating in audio processing and update all user's locations based on a time schedule or manually when initiated by the first user.

A signal is sent to other user's device computers by the first user's device computer to initiate at least a microphone or radio of other user's device computers and/or the first user's device to pick up audio (step 152), for example by the audio processing program 66. The signal may be sent to the other user's device computers via a network. The audio preferably comprises spoken language, rather than noise or other environmental sounds.

Audio received by the microphone or radio of another user's device computer is monitored for the first user's preferences (step 154), for example by the audio processing program 66.

When a preference, as designated by the first user, is detected within the monitored audio (step 156), a notification of the preference detected in the audio being monitored is sent to the first user (step 158), for example by the audio processing program 66. The notification may be audible or visual. In terms of identifying voices, a voice print may be compared to audio files available from various sources such as social media platforms.

If the audio processing program 66 of the first user's device computer receives an indication to listen to the audio containing the preferences (step 160), the audio received from the other user's device computer via a network is amplified and outputted to the first user (step 162) and the method ends. The amplified audio may be outputted to a speaker of the first user's device computer or a speaker of a separate device worn by the user.

If the audio processing program 66 of the first user's device computer does not receive an indication to listen to the audio containing the preferences (step 160), and the first user does not provide an indication to record the audio (step 164), the audio is discarded (step 166) and the method returns to step 154 of monitoring audio of other users for preferences selected by the first user.

If the audio processing program 66 of the first user's device computer does not receive an indication to listen to the audio containing the preferences in real time (step 160), but the first user provides an indication to record the audio for later playback (step 164), the audio is recorded for a specific amount of time and stored in a repository (step 168) for playback at the first user's request and the method ends.

In another embodiment, the method of FIG. 3 may be carried out without a sound map. Instead, the method would begin by the audio processing program 66 receiving an indication from the first user to send a signal to other user's device computers to initiate at least a microphone or radio of other user's device computers to pick up audio and the method would continue as shown in FIG. 3 from step 152.

In an example, a first executive is present at a conference held by the company in which they work. The first executive has provided the audio processing program with preferences for audio to monitor. For example, a ranked list of contacts based on their role in the company and a list of ranked keywords to be monitored for. More specifically, to monitor audio and notify the first executive whenever the CEO of their company is speaking and whenever keywords associated with a project the first executive was working on is discussed by co-workers.

The first executive is engaged in a conversation with a second executive who mentions the project associated with keywords preset by the first executive, the mobile device of the first executive provides a notification to the first executive indicating the keywords were present. The first executive indicates that they would like amplified audio of the conversation. The amplified audio may be delivered to the first executive through a speaker of the mobile device or a device connected to the mobile device and worn by the first executive.

At the same time, other co-workers may be discussing the project in another portion of the room. The keywords preset by the first executive are identified and a notification is sent to the first executive. The first executive indicates that they wish to listen to the conversation later, and the mobile device records the audio containing the keywords for a specific amount of time taking place between other individuals at a different location in the room than the first executive.

When the first executive is having a conversation with other co-workers in the conference room, the CEO of the company begins a talk on the direction of the company. The first executive receives a notification that the CEO is speaking and the first executive indicates that they would like to receive amplified audio of the conversation. The amplified audio of the CEO speaking is sent to the first executive and played for the first executive while the first executive is speaking with other co-workers. Alternatively, if the first executive has already heard the talk given by the CEO and does not wish to receive the amplified audio, in response to the notification that the CEO is speaking, the first executive declines amplified audio.

In another example, the first executive can choose on a sound map to receive processed audio of a specific co-worker or a portion of the room, for example near the food.

FIG. 4 illustrates internal and external components of a first user's device computer 52, other user's device computers 56a-56n, and a server computer 54 in which illustrative embodiments may be implemented. In FIG. 4, a first user's device computer 52, other user's device computers 56a-56n, and a server computer 54 include respective sets of internal components 800a, 800b, 800c and external components 900a, 900b, 900c. Each of the sets of internal components 800a, 800b, 800c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, audio processing program 66, and sound map program 67 are stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b, 800c also includes a R/W drive or interface 832 to read from and write to one or more portable computer-readable tangible storage devices 936 such as a CD-ROM, DVD, memory stick, magnetic tape, magnetic disk, optical disk or semiconductor storage device. Audio processing program 66 and sound map program 67 can be stored on one or more of the portable computer-readable tangible storage devices 936, read via R/W drive or interface 832 and loaded into hard drive 830.

Each set of internal components 800a, 800b, 800c also includes a network adapter or interface 836 such as a TCP/IP adapter card. Audio processing program 66 and sound map program 67 can be downloaded to the first user's device computer 52 and server computer 54 from an external computer via a network (for example, the Internet, a local area network or other, wide area network) and network adapter or interface 836. From the network adapter or interface 836, audio processing program 66 and sound map program 67 are loaded into hard drive 830. Audio processing program 66 and sound map program 67 can be downloaded to the other user's device computers 56a-56n and server computer 54 from an external computer via a network (for example, the Internet, a local area network or other, wide area network) and network adapter or interface 836. From the network adapter or interface 836, audio processing program 66 and sound map program 67 are loaded into hard drive 830. The network may comprise copper wires, optical fibers, wireless transmission, routers, firewalls, switches, gateway computers and/or edge servers.

Each of the sets of external components 900a, 900b, 900c includes a computer display monitor 920, a keyboard 930, and a computer mouse 934. Each of the sets of internal components 800a, 800b, 800c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Audio processing program 66 and sound map program 67 can be written in various programming languages including low-level, high-level, object-oriented or non object-oriented languages. Alternatively, the functions of an audio processing program 66 and a sound map program 67 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of processing audio through devices connected in a network, wherein one of the devices is a device of a first user and at least one of the devices is a device of another user comprising at least an audio sensor for detecting audio from the other user, and the device of the first user comprising a processor coupled to at least a speaker for outputting audio, the method comprising the steps of:
the device of the first user detecting a location of the first user;
the device of the first user creating a sound map of an area of the location of the first user, the sound map comprising physical locations of at least other users relative to the detected location of the first user;
the device of the first user displaying the sound map to the first user;
the device of the first user receiving a selection of a physical area on the sound map from the first user;
the device of the first user monitoring audio from at least one audio sensor on a device of another user for preferences selected by the first user within the physical area on the sound map selected by the first user;
when the device of the first user detects a preference within the audio, the device of the first user:
sending a notification to the first user regarding preference detected; and
based on an input from the first user, playing the audio from the physical area on the sound map selected by the first user for the first user through the speaker.

2. The method of claim 1, further comprising the step of the device of the first user recording the detected audio and storing the recorded audio in a repository.

3. The method of claim 1, wherein the speaker is part of the first device.

4. The method of claim 1, wherein the speaker is worn by the first user.

5. The method of claim 1, wherein the preference is at least one word.

6. The method of claim 1, wherein the preference is a voice of a specific individual.

7. The method of claim 1, wherein the input from the first user identifies other users within the physical area selected on the sound map, such that audio from the identified users is detected by the device of the first user as a preference.

8. The method of claim 1, wherein the input from the first user identifies a specific location within the physical area selected on the sound map, such that audio from the users at the identified location is detected by the device of the first user as a preference.

9. The method of claim 1, further comprising the step of the device of the first user searching a location map of the area in the detected location of the first user for other users in the area, and adding the locations of the users found through the location map to the sound map.

10. A computer program product for processing audio through devices connected in a network, wherein one of the devices is a device of a first user and at least one of the devices is a device of another user comprising a computer comprising at least one processor, one or more memories, one or more computer readable storage media, the computer program product comprising a computer readable storage medium having program instructions embodied therewith, at least an audio sensor for detecting audio from the other user, and the device of the first user comprising a computer comprising at least one processor coupled to at least a speaker for outputting audio, one or more memories, one or more computer readable storage media, the computer program product comprising a computer readable storage medium having program instructions embodied therewith, the program instructions executable by the computer to perform a method comprising:
creating, by the device of the first user, a sound map of an area of the location of the first user, the sound map comprising physical locations of at least other users relative to the detected location of the first user;
displaying, by the device of the first user, the sound map to the first user;
receiving, by the device of the first user, a selection of a physical area on the sound map from the first user;
monitoring, by the device of the first user, audio from at least one audio sensor on a device of another user for preferences selected by the first user within the physical area on the sound map selected by the first user;
when the device of the first user detects a preference within the audio:

sending by the device of the first user, a notification to the first user regarding preference detected; and based on an input from the first user, playing the audio from the physical area on the sound map selected by the first user for the first user through the speaker.

11. The computer program product of claim 10, further comprising program instructions of recording, by the device of the first user, the detected audio and storing the recorded audio in a repository.

12. The computer program product of claim 10, wherein the preference is at least one word.

13. The computer program product of claim 10, wherein the preference is a voice of a specific individual.

14. The computer program product of claim 10, wherein the input from the first user identifies other users within the physical area selected on the sound map, such that audio from the identified users is detected by the device of the first user as a preference.

15. The computer program product of claim 10, wherein the input from the first user identifies a specific location on the sound map, such that audio from the users at the identified location is detected by the device of the first user as a preference.

16. The computer program product of claim 10, further comprising the program instructions of searching, by the device of the first user, a location map of the area in the detected location of the first user for other users in the area, and adding the locations of the users found through the location map to the sound map.

17. A method of processing audio through devices connected in a network, wherein one of the devices is a device of a first user and at least one of the devices is a device of another user comprising at least an audio sensor for detecting audio from the other user, and the device of the first user comprising a processor coupled to at least a speaker for outputting audio, the method comprising the steps of:

the device of the first user detecting a location of the first user;

the device of the first user receiving an identified physical region around the first user;

the device of the first user monitoring audio from at least one audio sensor on a device of another user for preferences selected by the first user;

when the device of the first user detects a preference within the audio, the device of the first user:

sending a notification to the first user regarding preference detected; and based on an input of the identified physical region around the first user, playing the audio from users in the identified physical region around the first user for the first user through the speaker.

18. The method of claim 17, wherein the identified physical region is a radius of 10 to 20 feet from the first user.

* * * * *